April 5, 1960 L. S. HAMER 2,931,394
VISIBLE WEDGE VALVE
Filed Sept. 13, 1954 2 Sheets-Sheet 2
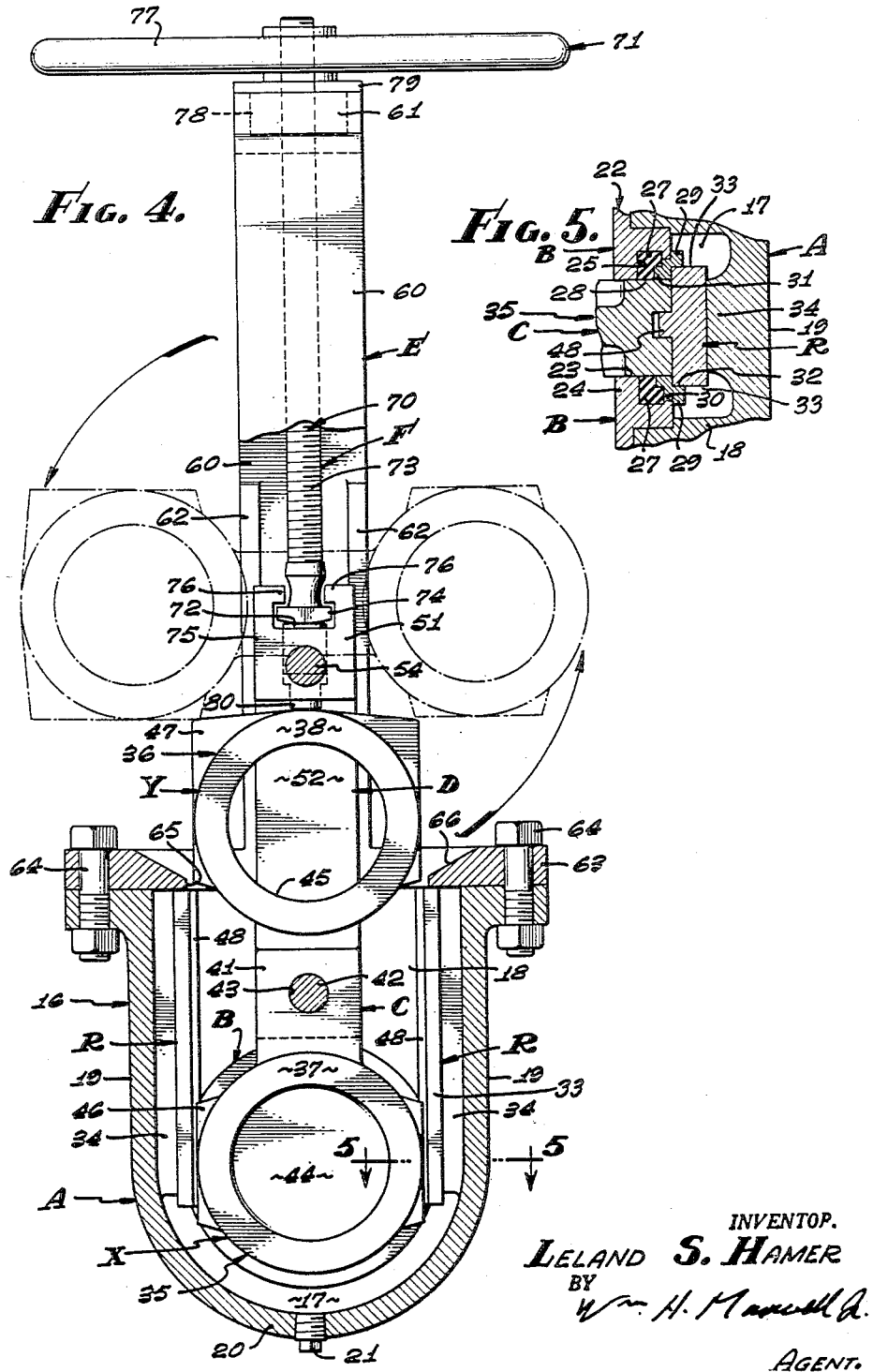
INVENTOR.
LELAND S. HAMER
BY
Wm. H. Maxwell
AGENT.

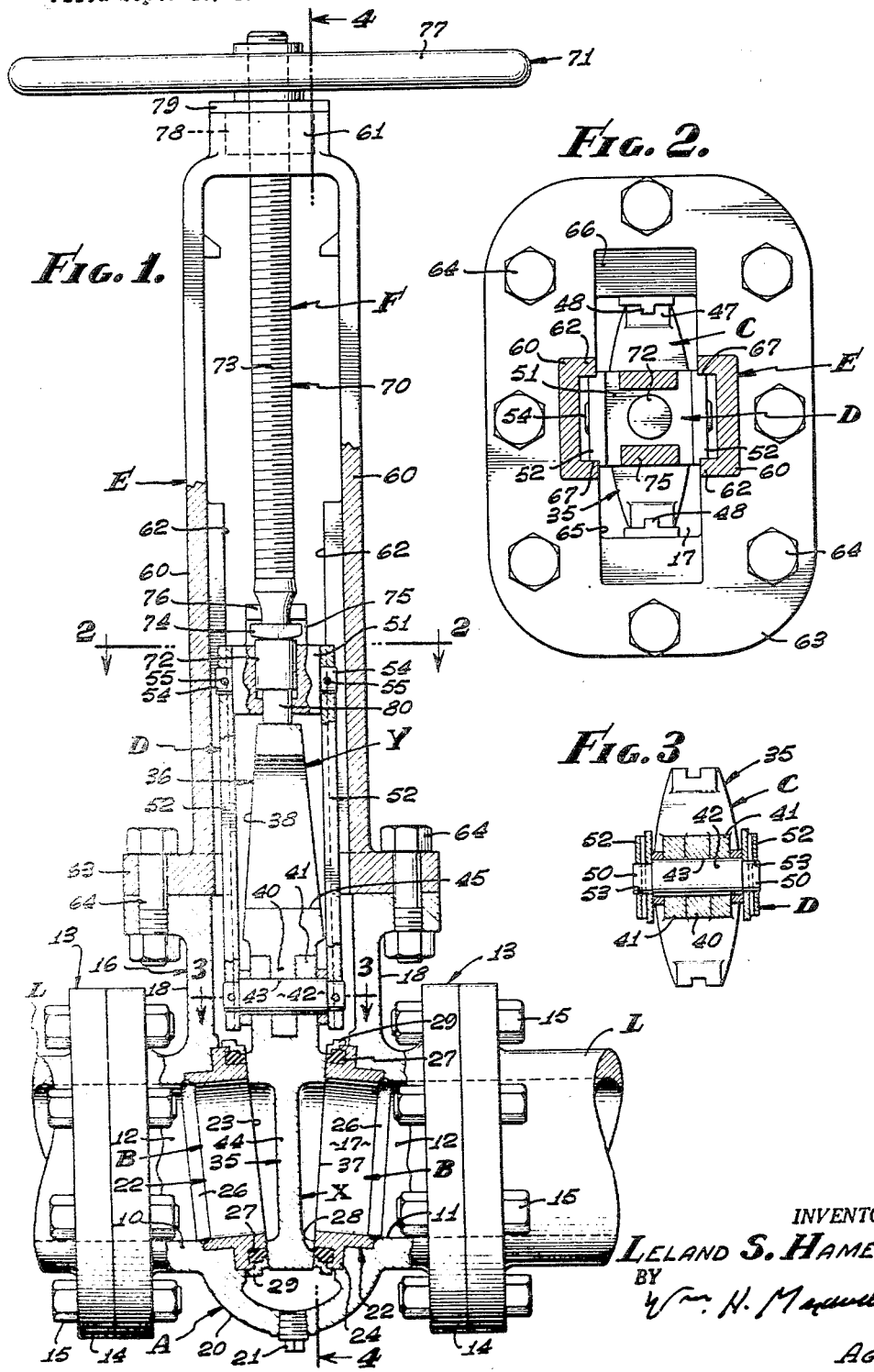

2,931,394
VISIBLE WEDGE VALVE

Leland S. Hamer, Long Beach, Calif., assignor to Chiksan Company, Brea, Calif., a corporation of California Application September 13, 1954, Serial No. 455,693

6 Claims. (Cl. 138—94.5)

This invention relates to a construction adapted to control flow through a pipe line and is particularly concerned with a shut-off valve for positively opening and/or closing the pipe line, it being a general object of this invention to provide a simple visible means for manually opening and/or closing a pipe line.

Heretofore, blinding plates and gate valves have been employed to open and close pipe lines and in either case there are certain inescapable disadvantages. In the case of the blinding plate fittings the pipe line must be spread apart somewhat and the plate manipulated by hand. In the case of gate valves the wedge-shaped valve element is completely housed so that its operation cannot be seen and, in many instances, not even determined. Furthermore, with gate valves deposits are many times formed preventing operation of the valve, and when leakage develops fluid by-passes the wedge to contaminate fluids in other pipe lines. These disadvantages have been completely eliminated in the visible wedge valve of the present invention.

It is an object of this invention to provide a valve construction wherein the valve element is visible at all times and acts to positively open and/or close the pipe line controlled by the valve.

Another object of this invention is to provide a wedge type valve element and construction which is leak-proof, in that leakage cannot occur between the sections of pipe line controlled by the valve. If leakage develops it occurs externally of the valve and is visible to inspection.

It is still another object of this invention to provide a valve construction of the character referred to wherein there is a continuous flow passage when it is in the open condition, there being no depressions or cavities for collecting deposits of scale or debris, such as is common in ordinary valve constructions. It is impossible with the construction of the present invention for foreign material to lodge in the valve when flow occurs therethrough.

A further object of this invention is to provide a valve of the character referred to with means for shifting the valve element of the structure to break loose and raise the element and to lower and drive the element into tight sealing engagement with the valve body. The valve that I have provided has a double ended valve element and means is provided to rotatably carry the valve element so that it is shiftable vertically of the structure and so that it may be easily reversed end-for-end.

Another object of this invention is to provide means for raising and lowering the valve element whereby the element is guided into and out of the seating position where it handles flow through the structure. In accordance with the invention I provide a carrier for shiftably and rotatably supporting the valve element so that it can be easily and quickly manipulated into and out of seating position within the body of the valve.

The various objects and features of my invention will be fully understood from the following detailed description of a typical preferred form and application of my invention, throughout which description reference is made to the accompanying drawings, in which:

Fig. 1 is a vertical sectional view through the visible wedge valve that I have provided, showing it connected in a pipe line. Fig. 2 is a sectional view taken as indicated by line 2—2 on Fig. 1. Fig. 3 is a detailed sectional view of a portion of the structure taken as indicated by line 3—3 on Fig. 1. Fig. 4 is a vertical transverse sectional view taken substantially as indicated by line 4—4 on Fig. 1, and Fig. 5 is an enlarged detailed sectional view of a portion of the structure taken as indicated by line 5—5 on Fig. 4.

The visible wedge valve of the present invention is adapted to be inserted in a pipe line L, or the like, and involves, generally, a body A with couplings adapted to secure the valve in the pipe line, seats B carried in the body, an elongate double-ended valve element C adapted to be engaged with the seats B to open or close the valve, a carriage D for shiftably and rotatably supporting the valve element C, guide means E for the carriage, and operating means F adapted to shift the carriage to raise and lower the valve element C into and out of cooperative engagement with the seats B.

The body A is adapted to be inserted in the pipe line L and is provided to handle flow of fluid to be controlled by the valve. The body A is characterized by an elongate tubular part 10 having a wall 11 forming a flow passage 12 that opens at the ends of the body. Couplings 13 are at the ends of the part 10 and may be in the form of flanges 14, or the like, provided with openings for receiving suitable fasteners, such as bolts 15, or the like. It is to be understood that the ends of the part 10 may be secured to the sections of the pipe line L in any suitable manner, as by welding.

The body A also involves an extension 16 that projects laterally from the part 10 midway between the ends thereof and forms a chamber 17 that intersects the passage 12. The extension 16 is vertically disposed and normal to the longitudinal axis of the body A and has longitudinally spaced end walls 18 and laterally spaced side walls 19. As clearly shown in Figs. 1 and 4 of the drawings, the extension 16 opens upwardly and is closed at its lower side by a bottom wall 20 forming a pocket adapted to catch fluid. A suitable drain plug 21, or the like, is provided to open the bottom of the extension 16 for drainage when desired.

The seats B are provided in the body A to receive the valve element C hereinafter described, and each seat is preferably a unit 22 carried in the body A on an axis somewhat inclined to the central longitudinal axis of the body A. The units 22 are opposed to each other and are annular units having flat opposed angularly related seating faces 23. The seating faces 23 are upwardly and outwardly divergent as shown in Fig. 1 of the drawings.

The units 22 are alike and each involves an annular insert 24 provided with the face 23 and having a recess 25 adjoining the face 23 and formed in the outer periphery of the insert. The insert 24 is carried in a bore in the body A and is secured to and sealed with the body A by means of a continuous seam of welding 26. An annular sealing ring 27 of suitable sealing material is carried in the recess 25, the ring 27 having a flat sealing face 28 that normally projects beyond the seating face 23 to the end that the ring 27 is compressed when the valve element C is in tight seating engagement with the seat B. In addition to the insert 24 and ring 27, each sealing unit 22 is provided with an annular keeper ring 29 that surrounds the sealing ring 27 and secures it in the recess 25. As shown, the ring 29 has a shoulder 30 engaged with the periphery of the insert 24 and has a lip 31 that holds the sealing ring in proper working position.

In accordance with the present invention I have provided inserts or retainers R that secure the keeper rings 29 and sealing rings 27 in working position. As shown, the inserts or retainers R are laterally spaced, vertically disposed parts that are parallel with each other. Each ring 29 is provided with notches 32 in diametrically opposite sides thereof and in the front face thereof, as clearly illustrated in Fig. 5 of the drawings. The spaced retainers have edges 33 that are engaged in the notches 32 thereby holding the rings 29 tightly on the inserts 24. The inserts or retainers R are positioned laterally of the body A by means of the notches 32 which prevent inward movement of the retainers and by means of bosses 34 provided in the chamber 17 which prevent outward movement of the retainers. It will thus be apparent how the sealing rings 27 are secured in the units 22.

The valve element is an elongate part having a pair of like flow controlling wedges 35 and 36 adapted to be forced into tight seating and sealing engagement between the units 22. The wedges 35 and 36 are essentially alike and each is a flat tapered part having flat angularly related faces 37 and 38, respectively, that face in opposite directions longitudinally of the body A and which are adapted to have flat seating engagement with the faces 23. The faces 37 and 38 are outwardly convergent and may be circular in configuration, as shown in Fig. 4 of the drawings, and are connected together at their inner ends by an arm 40. The wedges 35 and 36 may be separate parts in order to simplify machining of the wedges, in which case the wedge 36 is provided with an arm 40 and the wedge 35 has ears 41 projecting laterally therefrom to overlie the opposite sides of the arm 40. The arm 40 and ears 41 are shaped so that they are keyed together and they are fastened against separation by a pin 42 that passes through registering openings 43 which are provided in the arm and the ears.

The valve element C is provided to open and close the flow passage 12 and, therefore, the valve element is reversible having an imperforate section X and a perforate section Y. As illustrated, the wedge 35 forms the section X and is provided with a wall 44, while the wedge 36 forms the section Y and is provided with an opening 45 corresponding in diameter to the flow passage 12. When the wedge 35 is in seating engagement with the seats B the wall 44 positively closes or shuts off flow through the passage 12, and when the wedge 36 is in seating engagement the opening 45 forms a continuation of the flow passage 12 allowing for full, free flow through the body A of the valve.

As shown in Figs. 2 and 4 of the drawings, bosses 46 and 47 are provided at diametrically opposite sides of the wedges 35 and 36, respectively. In the case of the wedge 35 the bosses 46 are of nominal size, while in the case of the wedge 36 the bosses 47 are enlarged to compensate for the opening 45, to the end that the ends of the valve element C are of substantially the same weight. The bosses 46 and 47 have vertical channels formed therein to engage with elongate, vertically disposed guide rails 48 projecting inwardly from the inserts or retainers R. With this relationship of parts the wedges 35 and 36 are accurately guided into and out of position between the seat units 22.

The carriage D is provided to shiftably and rotatably carry the wedges 35 and 36 of the valve element C into and out of the chamber 17 where the wedges cooperate with the units 22 to open or close the passage 12. As clearly shown in Figs. 1 and 4 of the drawings, the pin 42 extends longitudinally of the body A on an axis spaced from the central axis of the body and is provided at its ends with bearings 50. The carriage D involves, generally, a head 51 positioned above the valve element C and arms 52 that depend from the head 51 and engage the bearings 50 to carry the valve element. As shown, there is a pair of like arms 52, one at each end of the valve element C and adjacent the faces thereof.

Aligned bearing openings 53 are provided at the lower ends of the arms to be engaged with the bearings 50. The head 51 and arms 52 may be integral. However, they are shown as being formed separately, in which case the head is provided with a pair of trunnions 54 that are engaged by and carry the arms 52 so that the arms extend downwardly from the head. Cotters 55, or like pins, may be provided to secure the arms to the trunnions and pin. It will be apparent that the carriage D supports the valve element C so that it can be raised and lowered and so that it can be rotated end for end, depending upon which wedge is to be used.

The guide E is provided to restrict the carriage D to movement vertically of the structure and involves a pair of supports 60, a header 61 carried by the supports and rails 62 adapted to cooperate with the carriage so that the carriage is held against rotation. The supports 60 are vertically disposed and project upwardly from each end of the structure. In practice, the supports 60 are carried by a base plate 63 secured to the outer or upper open end of the extension 16 by suitable fasteners 64. The plate 63 is provided with an aperture 65 of substantial width beveled at 66 so that the wedges 35 and 36 may be readily withdrawn from the chamber 17 and rotated end for end.

The header 61 is carried at the uppermost ends of the supports 60 to tie the supports together and to carry parts of the operating means E hereinafter described. As shown, the plate 63, arms 60 and header 61 may be integrally formed.

The rails 62 are formed on the support 60 to slidably support the carriage D and, as shown, there are two supports 60 opposed to each other and the rails 62 project inwardly from the supports and extend longitudinally thereof. In practice, the carriage is provided with recesses 67 that slidably engage with the rails 62 and prevent rotation of the carriage relative to the valve structure.

In order to raise and lower the carriage D and valve element C I have provided the operating means F which is adapted to apply the necessary force to adequately handle and move the valve element as required. As shown, the means F is a mechanical means and involves, generally, an operating stem 70 coupled to the head 51, a manually operable means 71 for shifting the stem 70 and a driver 72 operated by the stem 70 and adapted to force the valve element C into pressure engagement between the seat units 22.

The operating stem 70 extends vertically of the structure between the supports 60 and is an elongate cylindrically shaped part having external screw threads 73. The stem 70 is coupled to the head 51 to be held against rotation relative thereto and is provided at its lowermost end with an enlargement 74 polygonal in form and which has keyed engagement with a pair of projections 75 on the top of the head 51. The projections 75 are provided with inwardly turned lips 76 engageable by the enlargement 74 to lift the head 51 when the stem is operated vertically.

The manually operable means 71 is provided to move the stem 70 vertically upwardly and downwardly, and preferably involves a hand wheel 77 that drives an internally threaded nut 78 engaged with the threads 73 on the stem 70. The nut 78 is confined to the header by suitable retaining means indicated at 79 and when the nut is rotated the stem is shifted or moved vertically. With the structure thus far described it will be apparent that the individual wedges are raised and lowered by the carriage D and operating means F. That is, the valve element may be raised so that the desired wedge may be selected, and the valve element may be lowered and forced into seating engagement with the seats B.

It is a feature of this invention that I have provided the driver 72 which is a simple elongate pin vertically disposed and shiftable in the head 51. The driver 72 is of sufficient length to be engaged by the lower end of the stem 70 and at the same time engage the uppermost end of the valve element C. The driver 72 is held in working position by a turned portion 80 of reduced diameter that engages a shoulder in the head 51 upon excess travel of the driver.

From the foregoing it will be observed that I have provided an extremely simple valve construction wherein the valve element C is visible at all times so that a person operating the valve can readily determine the action thereof. With the structure of the present invention the valve element can be quickly manipulated by simple rotation of the hand wheel 77, whereby the stem 70 is raised or lowered, as desired, to move the valve element into and out of operating position to either open or close the passage 12 through the body A of the valve. With the valve element balanced, as above described, it is a simple matter to swing the desired wedge 35 or 36 into approximately vertical alignment, whereupon the guides projecting from the retainers R act to direct the wedges accurately into place between the seat units 22. When it is desired to secure the valve in operating condition it is merely necessary to apply sufficient pressure to the hand wheel 77 whereupon the stem 70 urges the carriage and valve element downwardly. When the driver 72 is employed the stem 70 urges the driver 72 downwardly and into pressure engagement with the uppermost part of the valve element C, which operation acts to wedge the valve element tightly into seating and sealing engagement with the seats B.

Having described only the typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A visible wedge valve of the character described including, an elongate tubular body having a flow passage extending therethrough, an extension projecting laterally of the body midway between the ends thereof and defining a chamber opening at the top of the body, seats carried in the body and occupying the said chamber and spaced apart, an elongate normally vertically disposed valve element within said chamber and having like wedges at the opposite ends thereof adapted to have seating engagement with the spaced seats, a laterally shiftable carriage in alignment with the extension and rotatably supporting the valve element to selectively raise and lower the wedges thereof into and out of said seating engagement, and guide means guiding the valve element in the body and including guide rails in the chamber and engageable in vertical channels in the sides of the wedges.

2. A visible wedge valve of the character described including, an elongate tubular body having a flow passage extending therethrough, an extension projecting laterally of the body midway between the ends thereof and defining a chamber opening at the top of the body, seats carried in the body and occupying the said chamber and spaced apart, an elongate vertically disposed valve element projecting into said chamber and having like wedges at the opposite ends thereof adapted to have seating engagement with the spaced seats, a vertically shiftable carriage above the extension and rotatably supporting the valve element to selectively raise and lower the wedges thereof in the extension and into and out of said seating engagement, and a guide carried by the body to project upwardly from said extension and engaged with and directing movement of the carriage guide means guiding the valve element in the body and including guide rails in the chamber and engageable in vertical channels in the sides of the wedges.

3. A visible wedge valve of the character described including, an elongate tubular body having a flow passage extending therethrough, an extension projecting laterally of the body midway between the ends thereof and defining a chamber opening at the top of the body, seats carried in the body and occupying the said chamber and spaced apart, an elongate valve element projecting into said chamber and having like wedges at the opposite ends thereof adapted to have seating engagement with the spaced seats, a vertically shiftable carriage above the extension and rotatably supporting the valve element to selectively raise and lower the wedges thereof in said chamber and into and out of said seating engagement, a guide carried by the body to project upwardly from said extension and engaged with and directing movement of the carriage, a stem carried by the guide and coupled to the carriage, a means for vertically shifting the stem and guide means guiding the valve element into engagement between the seats and including vertically disposed channels in the opposite sides of each wedge and elongate, vertically disposed rails in the chamber and engageable in the channels of the wedge occurring in the chamber.

4. A visible wedge valve of the character described including, an elongate tubular body having a flow passage extending therethrough, an extension projecting laterally of the body midway between the ends thereof and defining a chamber opening at one side of the body, seats carried in the body and occupying the said chamber and spaced apart, a wedge-shaped valve element projecting into said chamber movable into and out of seating engagement with the spaced seats, a laterally shiftable carriage in alignment with said extension and supporting the valve element to shift the element in the chamber and into and out of said seating engagement, a guide carried by the body to project laterally from said extension and engaged with and directing movement of the carriage, a stem carried by the guide and coupled to the carriage, and a means for shifting the stem, there being an independently shiftable drive pin operated by the stem and adapted to engage the uppermost end of the valve element to force said element into tight seating engagement.

5. A visible wedge valve of the character described including, an elongate tubular body having a flow passage extending therethrough, an extension projecting laterally of the body midway between the ends thereof and defining a chamber opening at the top of the body, seats carried in the body and occupying the said chamber and spaced apart, an elongate valve element projecting into said chamber and having like wedges at the opposite ends thereof adapted to have seating engagement with the spaced seats, a vertically shiftable carriage above the extension and rotatably supporting the valve element to selectively raise and lower the wedges thereof in the chamber and into and out of said seating engagement, a guide carried by the body to project upwardly from said extension and engaged with and directing movement of the carriage, a stem carried by the guide and coupled to the carriage and a means for vertically shifting the stem, there being an independently shiftable drive pin operated by the stem and adapted to engage the uppermost end of the valve element to force said element into tight seating engagement and guide means guiding the valve element into engagement between the seats and including vertically disposed channels in the opposite sides of each wedge and elongate, vertically disposed rails in the chamber and engageable in the channels of the wedge occurring in the chamber.

6. A visible wedge valve of the character described including, an elongate tubular body having a flow passage extending therethrough, an extension projecting laterally of the body midway between the ends thereof and defining a chamber opening at the top of the body, seats carried in the body and occupying the said chamber and spaced apart, a wedge-shaped valve element projecting into said chamber and movable into and out of seating engagement with the spaced seats, a vertically shiftable carriage above the extension and supporting the valve element to raise and lower the element in the chamber and into and out of said seating engagement, a pivot pin engaged through the valve element and carried by the carriage to rotatably support the valve element, a guide carried by the body to project upwardly from said extension and engaged with and directing movement of the carriage, a stem carried by the guide and coupled to the carriage and a means for shifting the stem, there being an independently shiftable drive pin operated by the stem and adapted to engage the uppermost end of the valve element to force said element into tight seating engagement.

References Cited in the file of this patent

UNITED STATES PATENTS

| | | |
|---|---|---|
| 1,933,182 | Pagon | Oct. 31, 1933 |
| 2,031,151 | Eulberg | Feb. 18, 1936 |
| 2,124,334 | Gray | July 19, 1938 |
| 2,309,304 | Creighton | Jan. 26, 1943 |
| 2,688,987 | Whalen | Sept. 14, 1954 |
| 2,707,488 | Overdijk | May 3, 1955 |